(12) United States Patent
Lowe

(10) Patent No.: US 7,142,645 B2
(45) Date of Patent: Nov. 28, 2006

(54) SYSTEM AND METHOD FOR GENERATING AND DISTRIBUTING PERSONALIZED MEDIA

(76) Inventor: Frederick Lowe, 1311-1-1 S. Plymouth Ct., Chicago, IL (US) 60605

( * ) Notice: Subject to any disclaimer, the term of this patent is extended or adjusted under 35 U.S.C. 154(b) by 0 days.

(21) Appl. No.: 11/040,166

(22) Filed: Jan. 20, 2005

(65) Prior Publication Data
US 2005/0185918 A1 Aug. 25, 2005

Related U.S. Application Data

(63) Continuation of application No. 10/605,527, filed on Oct. 6, 2003.
(60) Provisional application No. 60/416,127, filed on Oct. 4, 2002.

(51) Int. Cl.
H04M 1/64 (2006.01)
G06F 15/16 (2006.01)
(52) U.S. Cl. ...................... 379/88.16; 379/68; 709/231
(58) Field of Classification Search .............. 379/67.1, 379/88.13, 88.16, 88.19, 88.22, 88.23, 373.02, 379/373.03, 373.04, 374.02; 709/231
See application file for complete search history.

(56) References Cited

U.S. PATENT DOCUMENTS

| 5,444,767 | A | | 8/1995 | Goetcheus et al. ........ 379/67.1 |
|---|---|---|---|---|
| 6,122,617 | A | | 9/2000 | Tjaden ....................... 704/260 |
| 6,137,834 | A | * | 10/2000 | Wine et al. ................. 375/240 |
| 6,388,560 | B1 | * | 5/2002 | Parvulescu et al. ........ 340/7.52 |
| 6,529,586 | B1 | | 3/2003 | Elvins et al. ............. 379/88.13 |
| 6,694,219 | B1 | | 2/2004 | Graushar et al. ........... 700/223 |
| 2002/0138302 | A1 | * | 9/2002 | Bodnick ........................ 705/2 |
| 2004/0125925 | A1 | * | 7/2004 | Marsot .................... 379/88.22 |

* cited by examiner

Primary Examiner—Ovidio Escalante
(74) Attorney, Agent, or Firm—Dalina Law Group P.C.

(57) ABSTRACT

Personalized media is generated by obtaining a master clip having predefined insert points, obtaining an insert clip, seamlessly merging the insert clip into the selected master clip to generate a personalized media clip with undetectable transitions between spliced clips. An insert clip is utilized for purposes of adding variables such as a name, place, time, gender, product name or any other desirable information to a master clip. Dynamic context data may be added and transmitted to a client playback device. This distribution process may be in real-time or asynchronous until requested. The playback device may use the clip for ring tone, ringback tone or voice message or any other purpose. Although the contents of the master clip and/or the insert clip may use any voice including the originator's voice, celebrity voices or the voices of celebrity impersonators may be utilized. The master clip and insert clip may be seamlessly merged using uncompressed or compressed data in given formats.

18 Claims, 6 Drawing Sheets

SYSTEM AND METHOD FOR GENERATING AND DISTRIBUTING PERSONALIZED MEDIA

This application takes priority from U.S. Provisional Application Ser. No. 60/416,127 filed Oct. 4, 2002 entitled "METHOD AND APPARATUS FOR GENERATING AND DISTRIBUTING PERSONALIZED MEDIA CLIPS" which is hereby incorporated by reference. This application is a continuation of U.S. patent application Ser. No. 10/605,527 filed Oct. 6, 2003 entitled "METHOD AND APPARATUS FOR GENERATING AND DISTRIBUTING PERSONALIZED MEDIA CLIPS" which is hereby incorporated by reference.

BACKGROUND OF THE INVENTION

1. Field of the Invention

Embodiments of the invention pertain to the field of computer systems. More particularly, the invention is directed to a system and method for generating and distributing personalized media using computers.

2. Description of the Related Art

Modern systems generate and utilize multimedia data in a plurality of different ways. For example, users can currently communicate information to and hear responses from systems that generate audio data and transmit that data back to the user over the telephone. Typically, existing systems utilize a mapping between one form of data (e.g. numerical information or text data) and a set of audio files to generate an audio file for playback. One common scenario where this occurs is when calling a bank to check bank account balances or transfer money. The system at the bank may, for example, obtain a user's account information via touchtone input and audibly playback that users account information for purposes of confirmation. Existing systems for building and distributing such audio files use the input to map to a set of prerecorded audio tracks and assemble a message for playback. The end result is often times an awkward sounding message that fails to seamlessly integrate the prerecorded audio tracks. In addition to obvious transitions between clips, gaps of silence and intonation differences make this type of personalized media unagreeable to the human ear.

Existing solutions do not provide a way to generate an audio file that seamlessly integrates a plurality of audio files in a way that makes the generated file sound like an original recording with undetectable transitions, rather than a computer generated message. Moreover, current systems do not personalize the content of the generated audio file based on user information automatically obtained from the device or software program utilized to access the system and/or context information associated with the user. For example, current systems do not provide a mechanism for automatically generating and disseminating a personalized ring tones or ringback tones in real-time or in an asynchronous manner.

As a result of these limitations and others there is a need for a system and method for generating and distributing personalized media that is capable of seamlessly integrating media clips for real-time and asynchronous distribution.

BRIEF SUMMARY OF THE INVENTION

One or more embodiments of the invention are directed to a system and method for generating and distributing personalized media. Personalized media is generated via one or more embodiments of the invention by selecting one or more master clips having predefined gaps, obtaining insert data (e.g., an insert clip), seamlessly merging the insert data into the selected master clip to generate a media clip with undetectable transitions between spliced clips. Personalized media is distributed via one or more embodiments of the invention by optionally adding dynamic context data to the media clip, formatting the media clip for a given client device and transmitting the resulting media clip to a client device. This distribution process may be in real-time or delayed until the media clip is requested at a later time. Embodiments of the invention may utilize any computing environment from single processor computing systems to highly optimized multi-threaded server processes comprising seamless splicing of compressed media or any other architecture capable of achieving the desired scalability.

An insert clip may contain any type of data. In most instances, however, the insert clip is utilized for purposes of adding variables such as a name, place, time, gender, product name or any other desirable information to a master clip. The integration between the master clip and the insert clip is seamless meaning that there are no human detectable transitions between insertion points in the media clip. Regardless of the size of the insert clip the finished media clip lacks any noticeable gaps or intonation changes. Even though the media clip is generated using a plurality of different clips, the media clip sounds as if it was originally recorded in one take. Flash animation or other types of multimedia data such as video can be added to the media clip to enhance the user experience during playback. An insert clip comprising dynamic context data may include for example a time, date, location, temperature or any other information not available until the time of delivery.

Although the contents of the master clip and/or the insert clip may use any voice including the originator's voice, on many occasions celebrity voices or the voices of celebrity impersonators are utilized. The master clip, for instance, might be recorded by the celebrity and the insert clip recorded using a voice over artist. Thus, embodiments of the invention provide a mechanism for generating and distributing personalized media clips using what sounds like and/or is the voice of a celebrity. For instance, once the system merges one or more master clips together with one or more insert clips and thereby generates the media clip, the system can provide the media clip to a device and/or program for real-time playback or asynchronous pickup for later playback. In addition, embodiments of the invention may use computer synthesized and/or TTS (text to speech) software of varying complexity in order to simulate voices.

Playback of the media clip initiates at a number of different types of devices and can be triggered by a multitude of different events. Some examples of the types of playback devices (also known herein as destination clients) used in accordance with one or more embodiments of the invention, include (but are not limited to) a computational device configured to access a network (e.g., the World Wide Web (WWW)) via a browser, an email client, or some other network interface. A cell phone or any other type of portable or non-portable device (satellite, digital cable, and/or satellite radio) configured to output media clips (e.g., audio, video, etc . . . ) may also function as a playback device. A cell phone may obtain a personalized ring tone, personalized ringback tone, or personalized media clip for use with regards to any cell phone function via a cell gateway server. Alternatively, a cell phone itself may create a media clip locally for playing back personalized media in one or more embodiments of the invention during ring, ringback or at any other time. Any combination of generation of personalized media on a telephone server or locally is in keeping with the spirit of the invention.

Other types of playback devices may comprise for example a gasoline pump identifying a user via an RFID based device, such as SpeedPass®, a cash register comprising a credit card reader for identifying a customer, a slot machine or a hotel door comprising a hotel room key reader for identifying a guest, or any other device capable of identifying a user and playing back a media clip.

DETAILED DESCRIPTION OF THE INVENTION

In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

One or more embodiments of the invention are directed to a system and method for generating and distributing personalized media. Personalized media is generated via one or more embodiments of the invention by selecting one or more static clips comprising a master clip having predefined gaps or slots, obtaining insert data (e.g., an insert clip), seamlessly merging the insert data into the selected master clip to generate a media clip with undetectable transitions between spliced clips. Personalized media is distributed via one or more embodiments of the invention by optionally adding dynamic context data to the media clip, formatting the media clip for a given client device and transmitting the resulting media clip to a client device. This distribution process may be in real-time or delayed until the media clip is requested at a later time. Embodiments of the invention may utilize any computing environment from single processor computing systems to highly optimized multi-threaded server processes comprising seamless splicing of compressed media or any other architecture capable of achieving the desired scalability.

Figure 6:
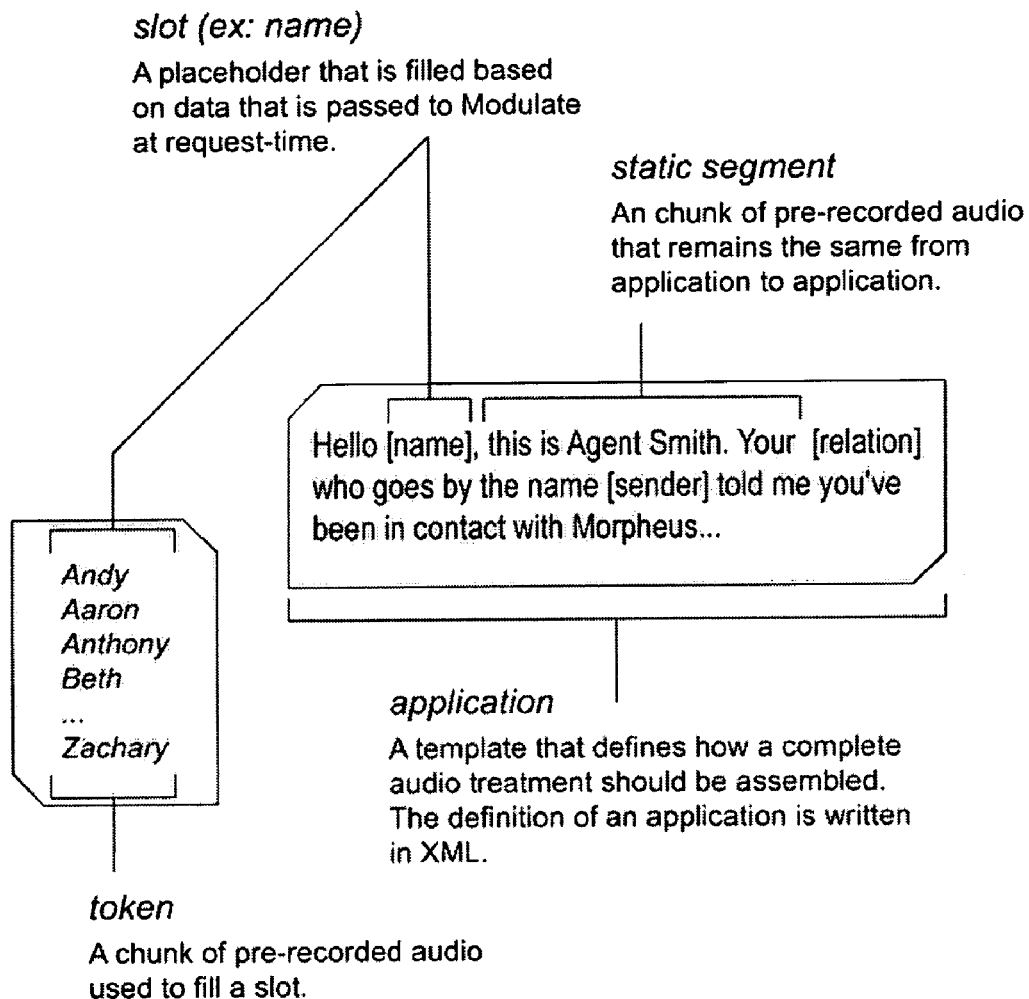
FIG. 6 illustrates an application comprising static clips comprising the master clip and insert clips otherwise known as tokens for insertion into slots or insert points of a given duration of the master clip.

FIG. 6 shows an "application", also known as a template specifying static segments that remain the same from application to application, slots or insert points with fixed or variable length durations with tokens or insert clips for insertion into the master clip.

An insert clip may contain any type of data. In most instances, however, the insert clip is utilized for purposes of adding variables such as a name, place, time, gender, product name or any other desirable information to a master clip. The integration between the master clip and the insert clip is seamless meaning that there are no human detectable transitions between insertion points in the media clip. Regardless of the size of the insert clip the finished media clip lacks any noticeable gaps or intonation changes. Even though the media clip is generated using a plurality of different clips, the media clip sounds as if it was originally recorded in one take. Flash animation or other types of multimedia data such as video can be added to the media clip to enhance the user experience during playback. An insert clip comprising dynamic context data may include for example a time, date, location, temperature or any other information not available until the time of delivery.

Although the contents of the master clip and/or the insert clip may use any voice including the originator's voice, on many occasions celebrity voices or the voices of celebrity impersonators are utilized. The master clip, for instance, might be recorded by the celebrity and the insert clip recorded using a voice over artist. Thus, embodiments of the invention provide a mechanism for generating and distributing personalized media clips using what sounds like and/or is the voice of a celebrity. For instance, once the system merges one or more master clips together with one or more insert clips and thereby generates the media clip, the system can provide the media clip to a device and/or program for real-time playback or asynchronous pickup for later playback. In addition, embodiments of the invention may use computer synthesized and/or TTS (text to speech) software of varying complexity in order to simulate voices.

A cell phone or any other type of portable or non-portable device (satellite, digital cable, and/or satellite radio) configured to output media clips (e.g., audio, video, etc . . . ) may function as a playback device. Embodiments of the invention may generate and distribute personalized ring tones and ringback tones based on caller identification and dialed caller party number. An example media or ring clip could utilize a celebrity voice to announce "[user name] your [relative type] is calling", where [user name] is the user's name spoken in the voice of a celebrity and [relative type] is selected from the list of {brother, mother, father, son, etc.}. In addition, ringback tones comprising the sound played to the calling user when waiting for another user to answer the phone may be personalized based on the calling party, i.e., using the caller identification number. The telephone server playing the ringback tone may query the personalized clip to play back utilizing the ANI and DNIS, i.e., caller identification and dialed called party number respectively.

In telephonic related embodiments of the invention, the cell gateway (also known as a portal operator) itself or alternatively any other telephone computer system or server coupled with the cell gateway may generate the resulting ring tone that plays on the receiving cell phone when it is ringing, or the resulting ringback tone that plays on the initiating cell phone when waiting for another user to answer. Alternatively, generating the ring tones, ringback tones and messages with personalized variables locally on the cell phone itself is in keeping with the spirit of the invention.

An embodiment of the invention allows for an RFID based device, such as SpeedPass® to provide a unique identification to a RFID reader which in turn provides for a personalized message to be played back by a gas pump electronic interface unit, which in this case would be the playback device. In this embodiment of the invention, the gas station local server, or company main server may contain the personalized variable information. When the unique identification is presented to either server, the resulting output media clip may be constructed on either server and played on the gas pump electronic interface unit. Bluetooth devices in the vehicle or coupled with the user may also play back the output media clip if the gas pump electronic interface unit is configured with WiFi or other wireless technologies configured to request media output.

Another embodiment of the invention enables a playback device such as a kiosk for purchasing plane tickets or groceries to identify and play personalized media messages to a user. Additional examples of playback devices used in embodiments of the invention include loyalty card readers, ATM machines, GPS devices in planes and cars. Hotel electronic doors are another example playback device where the insertion of an electronic key into the guest's door plays a message such as "Welcome [title] [user surname]" with title and user surname set to "Ms." and "Smith" respectively in this example. Playback devices may connect to embodiments of the invention comprising computational resources or if the playback device itself has enough computational power and storage comprising personalized information or can obtain the personalized information from an identifier associated with the user, may act as an embodiment of the invention in terms of constructing and playing the personalized media clip. In this example, the hotel electronic door may comprise a network connection to the hotel's computing system. This connection may be wireless or wired. The hotel computing system in this example may detect the electronic key or credit card-like magnetic key and determine the identification of the hotel guest. The personalized message comprising the "Welcome [title] [user surname]" media clip would then be generated on the hotel's computing system, sent to the electronic door and played on small speaker constructed into the electronic door.

Another playback device may be a credit card reader configured to play back a personalized message to a shopper after the user identifies themselves with the credit card. For example, media output in this case may include a Flash animation with the user's name and an audio track with the phrase, "Welcome [user name], your current purchase is missing your [time period] buy of [product name]", where [user name], [time period] and [product name] are insert clips that seamlessly combine with the master clip to create the output media clip.

Another example playback device may be a slot machine capable of identifying the user via credit card, RFID or hotel room key. The slot machine could play a message such as "[User name], you just won [winning amount] dollars!". In this example, the slot machine may be networked to a server comprising the computational power and requisite personalization clips to create the output media clip or the slot machine itself may obtain an identifier associated with the user and construct the media clip itself.

Another example playback device may be a digital cable set-top box where personalization occurs on a cable system server and is sent to the IP address of the cable box or uses the subscriber ID in order to encode a message on a data channel.

Another example playback device may be a toy which may be personalized at the factory at on-line purchase time or at home through a network connection or through a wireless interface to a local computer with a network connection or configured to run as an embodiment of the invention. In the case of internet shopping, the purchaser may choose the personalization clips that are to be inserted into the toy before shipping. For example, this would allow the toy to sound like a famous cartoon character and would arrive at the child preloaded. With inexpensive network devices available, network capable toys would be able to be dynamically loaded with personalized output media clips. Toys containing processing units would be able to switch output media clips based on accelerometers that could be used in order to determine if the older or younger sibling was playing with the toy. For example, the toy may cry out, "[user name] be nice to me", where [user name] would be the rougher of the two children in this example. Context information may be used in this embodiment of the invention as set by the parent. Encryption may be utilized within the media clip holding portion of the device in order to prevent hackers from creating toys with unwanted sounds, words or gestures.

In at least one embodiment of the invention, the time at which playback initiates depends upon the context of the device. Displaying a certain website, reading a particular email, calling a particular person, or being in a certain location are some of the examples of the different contexts that might trigger playback. These non-personal events or values may cause branching in determining what clips to splice together for final playback. For instance, a user of the system might initiate playback by visiting a certain web page (or some other type of online document or program) where the users will hear a personalized greeting from a celebrity. If, for example, the user visits an online bookstore, that user might receive a personal greeting from one of the user's favorite authors who then proceeds to promote his newest novel. If the context information associated with the time of day for example would indicate that a different master clip should be played, i.e., shorter clips from the author in the morning than at night, then embodiments of the invention may take branching actions based on this context information. Other examples include personalized messages via email, a cell phone or some other playback device. In addition, a timer function or calendar function may initiate a media clip transmission. Another example context function producing a asynchronous initiation of a media clip without user intervention may include a location context whereby a GPS receiver in a phone or car initiates a media message based on location. Any non-personalized information or information source may be used as a context source. HTTP is a stateless protocol and connections are generated when needed by a requesting device, therefore, devices accessing embodiments of the invention over this protocol must employ different means in which to recognize asynchronous notification such as polling or maintaining an open connection over a separate communications protocol.

Other embodiments of the invention would, for example, allow a manager to notify all members of his or her team in a personalized manner that there was a meeting on Monday, saving many phone messages. The master clip could in this example could be recorded and saved on a cell phone with each persons name recorded on the cell phone as well. Embodiments of the invention may contain software interfaces allowing the user to in effect produce the master clip by holding a given button when recording the master clip and assert another button when recording each variable insert clip. Alternatively, the user could simply access save bulk personalization messages and send them en masse when needed as in the case of staff meetings. Embodiments of the invention may alternatively operate without manager intervention whereby the group to be invited to the staff meeting is contained within a server and a calendar function on a management server sends personalized media clips to the attendees a predetermined amount of time before the meeting.

If the media clip is distributed via the WWW, the media clip may be generated and automatically transmitted when the user visits a particular web page. The invention contemplates the use of a variety of different techniques for dynamically generating media clips. In one embodiment, the system obtains user information from a cookie file to instantaneously render a personalized multimedia file. In other instances user data is already known by the system or obtained and confirmed via a log-in process.

If the media clip is to be distributed via electronic mail, cellular telephone, or some other telecommunication mechanism, embodiments of the invention may utilize a database of user information to assemble the media clip. A content provider that wishes to distribute a media clip (e.g., a personalized advertisement or some other personalized media clip) could provide a request to the system for processing. The system utilizes the request, which identifies or contains at least one master clip to be readied for playback and contains type information associated with each of the locations where insert clips are to be merged into the master clip. The type information is then utilized to obtain user information from a system database and the user information is in turn used to obtain relevant insert clips for purposes of generating a media file. Once the insert clips are obtained the system merges them together with the master clip and distributes the completed media clip to the user via email or some other distribution means. In the case of cell phones, a ring tone or a ringback tone may be generated via an embodiment of the invention and stored on a telephone company server for play when ringing a user, or for playing to a user that is ringing another user in the case of ringback tones. The information in the system may be queried by ANI and DNIS, caller identification and dialed called party respectively.

Figure 1:
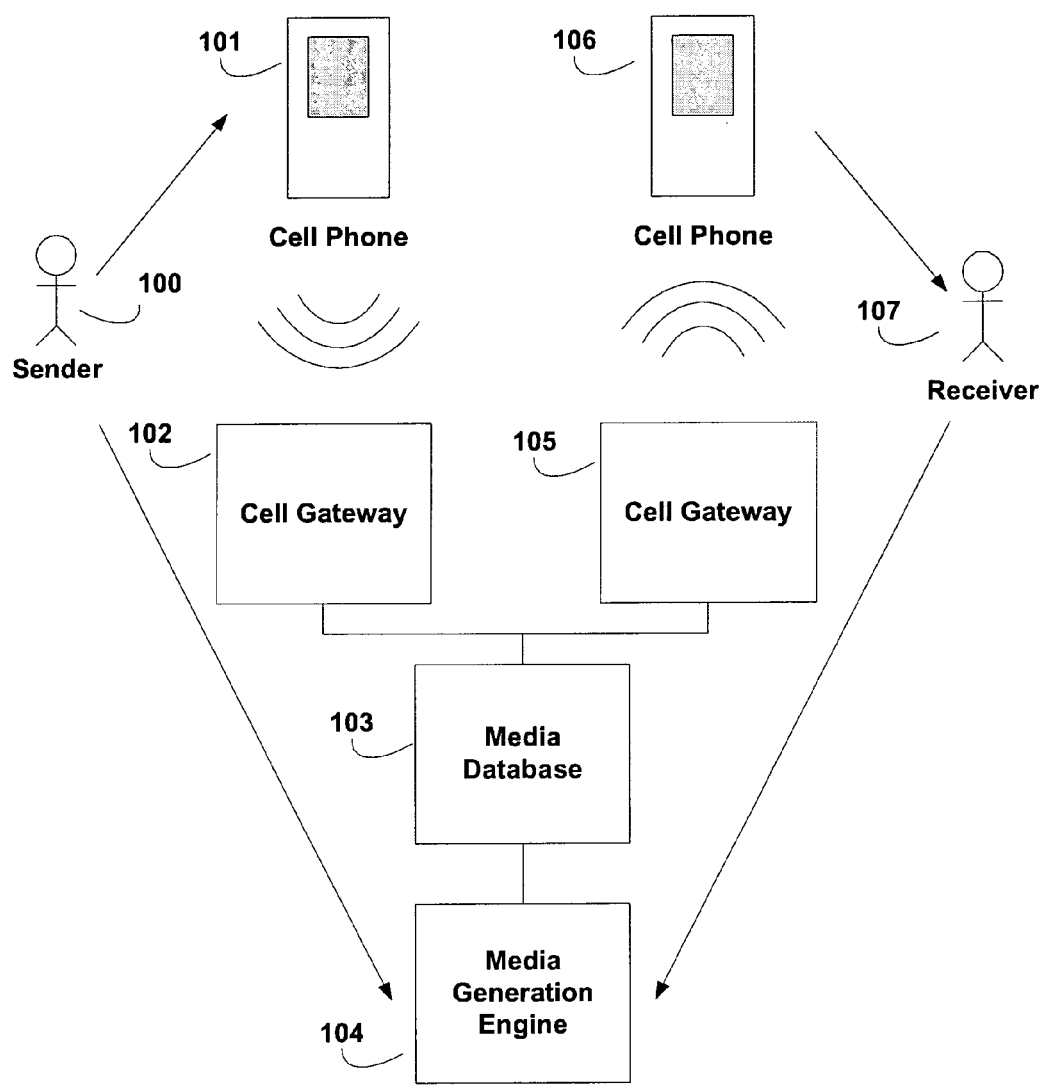
FIG. 1 illustrates an architectural view of an embodiment of the invention for generating and distributing personalized media.

FIG. 1 illustrates an architectural view of an embodiment of the invention for generating and distributing personalized media. Embodiments of the invention provide a user such as sender 100 with a way to generate and distribute media clips to one or more other recipients such as receiver 107. The reader should note that the term user, sender and receiver as used herein refers to a person using an embodiment of the invention and/or to processes such as computer applications that are programmed to run at specific times and execute programmed tasks. Typically, sender 100 utilizes a client to connect with receiver 107. A client is typically a computing device capable of communicating through a network with one or more types of networks. An example client as shown in this embodiment of the architecture is cell phone 101 or 106. The client may alternatively comprise a computing device such as a computer equipped with at least one processor, memory and storage media. The computing device is equipped and configured to communicate using at least one network communication means. For example, a client may be equipped with a modem to communicate through (wire based or wave based wireless) telephone services or alternatively may be configured to communicate through one or more networking protocols such as Transmission Control Protocol (TCP) in combination with the Internet Protocol (IP) over the Internet.

Computing devices include cellular telephones, Personal Digital Assistants (PDA), desktop computers, laptop computers or any other electronic apparatus capable of communicating though a wire-based and/or wireless network may be utilized as a client. For example, a client may be a personal digital assistant equipped with a browser capable of rendering Hypertext Markup Language (HTML), a JAVA virtual machine capable of running applets received from a remote server, and any other computer program code that supports communication between the user and a remote machine. Other applications allow the user to upload personal media clips such as an email client, data streaming service supported by the client, a HyperText Transport Protocol (HTTP) posting and any other means that allows a user to post media clips to media generation server 104.

Client 106 (also referred to as a playback device) comprises media player. For example, a client 106 may be a cell phone that allows one or more users to access a media database 103 to play media clips. Other types of multimedia destination clients may consist of a desktop computer equipped with a multimedia player, a personal digital assistant and any other electronic device capable of playing a media clip or allowing access to a network location that delivers media clips.

A media server is designed to handle access to and the delivery of media clips and typically is capable of handling communication to senders and receivers for purposes of delivering media. An example of a media server is cell gateway 102 or 105. Other context information may be retrieved from a plurality of sources by the media server or media database (or other server coupled with the media database) such as calendar information, location information or any other information that may be utilized in inserting context information into a media clip.

Media server 105 is capable of connecting to third party servers (e.g., other websites), local or remote databases to collect context and/or media clips information. Client 106 may also comprise a scheduler component in order to poll for media clips from media server 105.

Systems embodying the invention may optionally utilize media generation engine 104 to process media clips. For example, after media server 105 determines the context and the master and insert clips to use for generating the output media clips, media server 105 may communicate that information to media generation engine 104 so media generation engine 104 can retrieve the data for the media clips from one or more storage locations in media database 103. Media server 105 uses the input information to generate one or more media clips.

Media clip generation involves applying one or more processing algorithms to the input data. Typical processing involves merging/mixing, audio dubbing, inserting media clips and any other type of processing that takes one or more media clips and generating one or more new media clips based on context information. Media server 105 may employ a highly optimized multi-threaded compressed media seamless splicing process in order to maximize the number of connections, network throughput and number of media clips that can be processed per media server 105 per unit time. Furthermore, embodiments of the invention may employ a cache in order to further minimize the processing involved for repetitive access applications whereby each successive access avoids accessing media database 103 and the associated delays with accessing a database versus reading memory directly. The cache may comprise a single concatenated media clip built out of the various static and insert clips, or may comprise the individual clips that are sent or constructed at real-time to produce the seamless output clip.

In embodiments of the invention, media database 103 is typically a commercial available or freeware relational database management system (RDBMS). Storage locations may also be any file system accessible locally or through a network or a memory cache.

Systems embodying the invention may comprise media production software components running on client 101 or any other client accessible by sender 100, or on media generation engine 104. Typically a media production system allows a user to utilize newly recorded media clips, or existing media clips to edit the media clips and prepare the media clips for usage with embodiments of the invention. The production phase is disclosed below in further detail, and involves producing media clips properties, attributes and symbols to allow, at a later stage, the multimedia generation engine to combine a plurality of media clips to generate an output one or more media clips. A separate production system may be utilized independent of media generation engine 104. Regardless of the location that the production occurs, generation allows a producer to create clips using real life recording or computer generated media that include audio, video or any other electronic data format. The system used for production allows users to generate master clips while saving insertion points, variable names for those insertion points and other attributes that associate the master clip with context information, and relationships between media clips.

Figure 2:
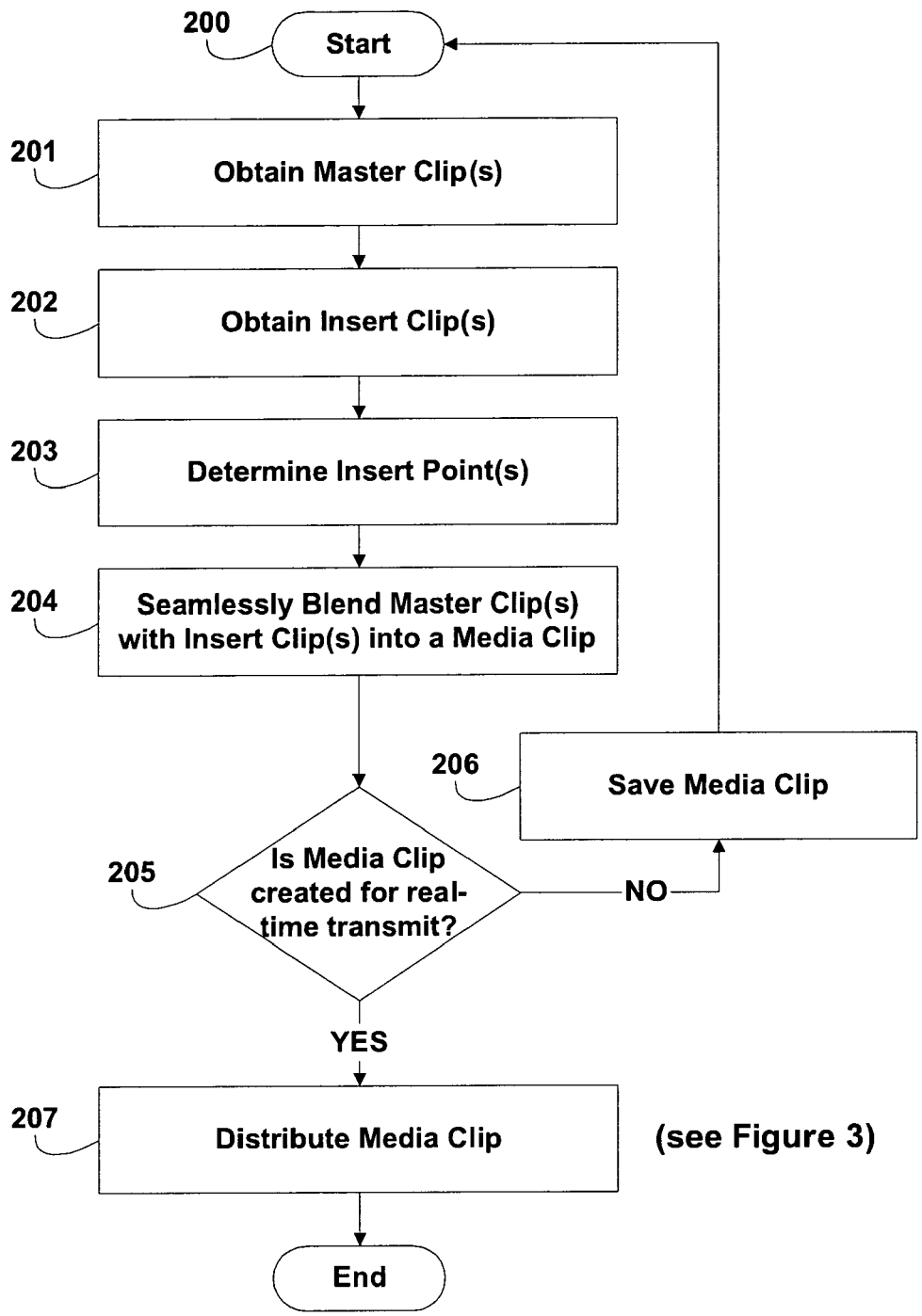
FIG. 2 illustrates a method for generating personalized media in accordance with one or more embodiments of the invention.

FIG. 2 illustrates a method for generating personalized media in accordance with one or more embodiments of the invention. The process starts at 200. The system obtains at least one master clip at 201 and obtains any associated insert clip(s) at 202. The system then determines the points within the master clip(s) where the insert clip(s) are to be inserted. The determination of the insert point(s) is accomplished by obtaining metadata detailing the location of the insert points or through any other method of describing the locations where the insert clips are to be inserted. The master and insert clips are then seamlessly blended into a media clip in order to mask any transition points between the master and insert clips. This will be described more fully below. Optionally the individual clips may be stored away for later access in a cache or database. If the media clip is to be transmitted immediately as determined at 205, then the media clip is distributed at 207 (see FIG. 3). If the media clip is being created for an asynchronous pickup, for example as used in a ring tone or ringback tone for a cell phone, then the media clip is saved at 206. The system then waits to start the process over at 200 when another media clip generation is requested.

Although the invention contemplates the use of many different interfaces (e.g., a web interface, email client, and/or any other type of device configured to execute playback of the media clip) there are some specific details and generalities associated with the use of each type of interface. For instance, the web interface and/or email interface provides users with a way to access, through an interconnection fabric such as a computer network, one or more server sites. To this end the client and server system supports any type of network communication, including, but not limited to wireless networks, networking through telecommunications systems such as the phone system, optical networks and any other data transport mechanism that enables a client system to communicate with a server system. The user interface also supports data streaming, as in the case of streaming multimedia data to a browser plug-in, a multimedia player, and/or any type of hardware device capable of playing multimedia data. In addition, other embodiments of the invention may utilize web service interfaces, or may take advantage of peer-to-peer architectures for obtaining and splicing clips to one another and delivering them to one or a great number of users.

In accordance with one or more embodiments of the invention, the user interface provides a mechanism for obtaining a unique identifier associated with each user that accesses the system. Any data item that uniquely identifies a user or device is referred to as a unique identifier. For embodiments of the invention directed to telephonic use, the ANI and DNIS (caller identification and dialed called party number respectively) may be utilized to query media database 103 in FIG. 1 for a media clip unique to the desired sender and receiver. This for example may be utilized in order to play a certain piece of music, or personalized message to a particular caller, but not to a different caller. In addition to playing a personalized message or piece of music in the case of a ringback tone, the overlay of an audible standard telephone ring may be performed in order for the sender to comprehend that the receiver's phone is actually ringing and that they are not on hold. In other embodiments of the invention a serial number and/or a user name and password can act as a unique identifier and thereby provide access to the system while restricting unauthorized access. In at least one implementation of the invention the unique identifier is a cookie file containing user information (e.g., user name, age, and any other information about the user) or a URL or pointer to the appropriate user information. Once the system obtains the cookie information, that information is used for purposes of rendering a personalized multimedia file. For instance, the system can utilize the information contained within the cookie file to determine which insert clip to associate with a master clip for purposes of rendering the media clip. By identifying users, embodiments of the invention are configured to selectively determine the content of the multimedia data based on user information such as a user type, and user preferences.

The system may obtain master clips, insert clips, and/or other multimedia clips from a variety of locations. Such locations include database storage systems, data files, network locations, hard drives, optical storage devices and any medium capable of storing data including but not limited to network resources comprising web services and peer-to-peer networks. In an embodiment of the invention, the storage location is a relational database system. A database system may hold the master clips and/or insert clips used to generate the media clips and/or a variety of other data or metadata associated with each media clip. The data associated with the media clip allows for categorizing, classifying and searching media clips based on attributes. In addition, metadata further comprises information about the clip including insert points, variable names at insert points, durations, and other items. Database systems may be configured to index data in the database for purposes of expediting the process of searching for specific information in the database. The database may comprise multiple mirrors to enable the system to scale up to handle a large number of concurrent users.

Figure 3:
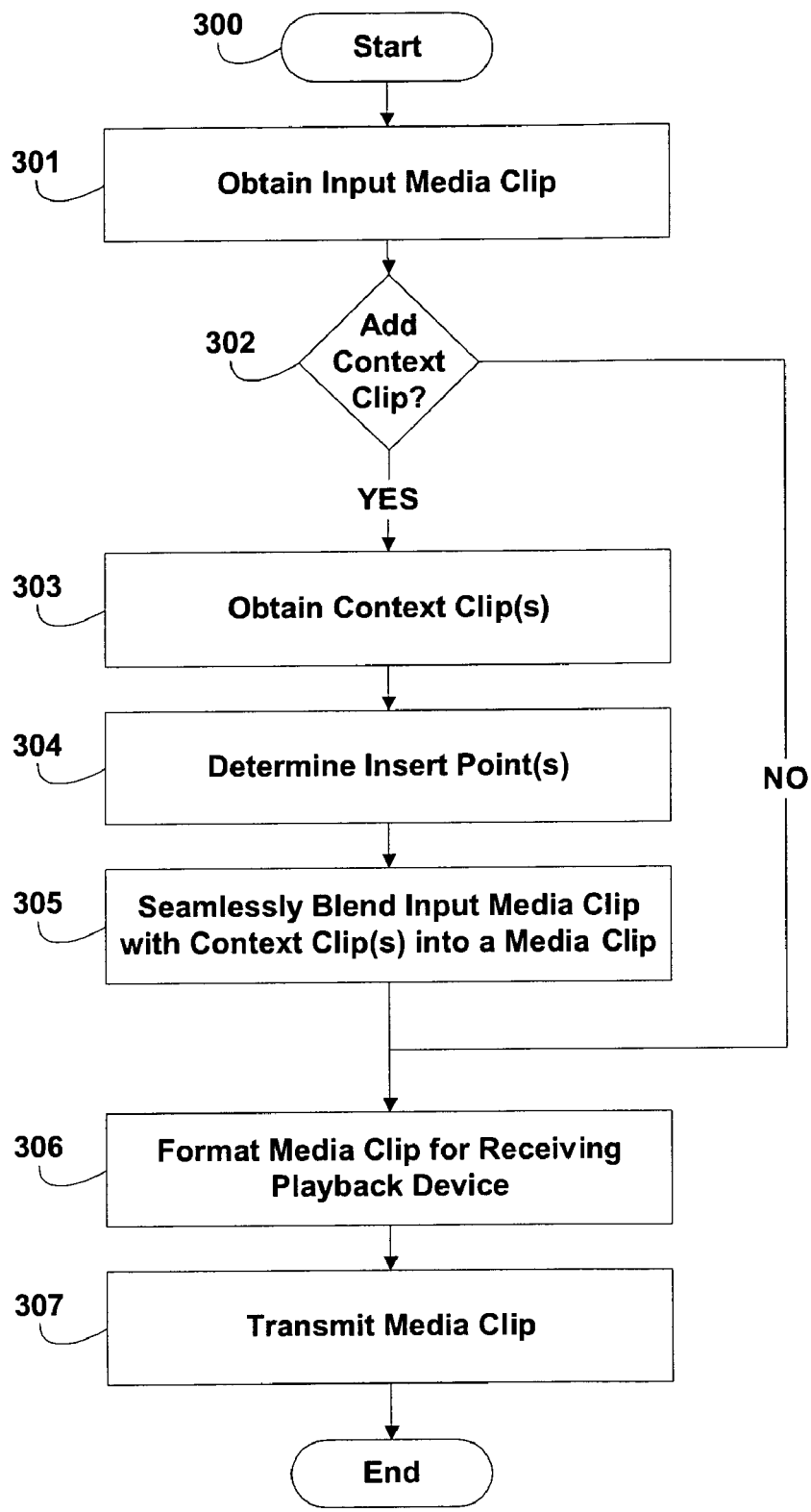
FIG. 3 illustrates a method for distributing personalized media in accordance with one or more embodiments of the invention.

FIG. 3 illustrates a method for distributing personalized media in accordance with one or more embodiments of the invention starting at 300. A media clip is obtained at 301 from media database 103 as shown in FIG. 1. If a media clip requires dynamic context data to be inserted before transmitting as determined at 302, then the context clip is obtained at 303. The insertion points for the context clip or clips is/are determined at 304. The context clip is seamlessly blended with the input media clip yielding a media clip comprising the context information at 305. If the media clip comprises no context information as determined at 302, or if context information is inserted then the media clip is formatted for the receiving playback device at 306. This may comprise formatting the media clip for a given audio format for example. The media clip is then transmitted to the client at 307.

Context information may be obtained from any number of sources. For example, multimedia attributes may be obtained from a database system, time from a clock system, events information from a calendaring system, geographical information from a global positioning system and any other system capable of providing context information to embodiments of the invention. Context information may combine attribute information and rule information to determine a means and time for initiating playback. For example, an event originating from a calendaring system may specify which delivery means to use for delivering the output media clip depending on time of the day, type of the event, events preceding (or succeeding) the event, or location of the user. If the user is online, playback may be via the web interface, or if the user is using email playback may be in the form of an email. If the user is not actively involved in these activities at playback time, the playback may be redirected to a cellular phone. The system may use other context attributes to determine exclusion rules between media clips. For example, insert media clips designed for use in certain contexts such as happy occasions, may only be used in some context categories and not others. By using intelligent tools to interpret context rules, embodiments of the invention allow for providing an engine that may automatically handle tasks on behalf of persons.

Figure 4:
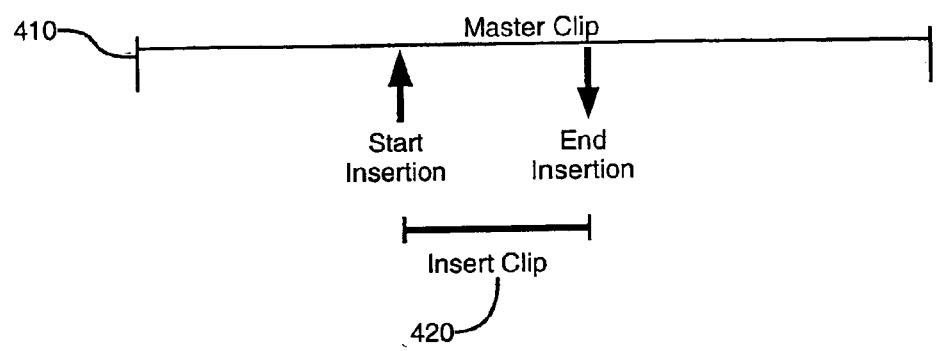
FIG. 4 illustrates a block diagram representing the elements of one or more media clips configured in accordance with one or more embodiments of the invention.

FIG. 4 illustrates a block diagram representing the elements of one or more media clips configured in accordance with one or more embodiments of the invention. The horizontal axis is in increasing time order from left to right. Master clip 410 contains any type of multimedia data including, but not limited to, audio and/or video. One or more master clips can be merged together to create a media clip ready for playback. Insert clip 420 can also contain any type of data (e.g., audio, video, etc . . . ). The system may combine two or more media clips to form either a master clip or insert clip so long as the clips have at least one property in common. For example, an audio clip may be merged with a video clip if the audio track included with the video clip has the same characteristics as the audio clip to be inserted. If the clips have a mismatch in sampling rate or format, they may be normalized before combining. Clips with different lengths may be front or back-end truncated or cross sampled faster or slow in order to fit the clip within the desired slot. Alternatively, the master clip may contain metadata stating that the time slot to fit an insert clip into is not fixed, meaning that the clips can simply be concatenated one after the other since there may not be background sound information which would cause a non-seamless splice to occur. This can also be thought of as appending master clips back to back, for example if no fixed time gap was left in a given master clip and another clip such as an insert clip is to be appended before yet another master clip. Regardless of the nomenclature, the idea is that the independent clips are seamlessly spliced in order to produce an output clip that is perceived as a single recorded clip. The location where the system interleaves insert clip 420 with one or more master clips 410 is marked by a start and end point, or start point and duration. The insert clip is recorded to use the entire duration between the start and end point, thereby allowing the insert clip to sound or appear seamlessly integrated with the master clip.

Obtaining a master clip or insert clip may involve recording a live performance (e.g., a commercial or an artistic performance by a band), or capturing computer synthesized sounds. A producer identifies the clips that are to become master clips and edits the clips or the voice track of a clip or clips in order to leave gaps for dropping one or more insert clips. For purposes of aiding in the retrieval of a particular clip, the producer may also input attributes to describe the sounds or the images in the media clips. Some examples of data that may serve as attributes are text keywords and key phrases, a sound clip preview, an image preview or any other data format that may characterize a media clip. The producer also determines among all available media clips those that are designed to be insert clips. Insert clips are fashioned in embodiments of the invention to be inserted or mixed at one or more locations in one or more media clips (e.g., master clips). In some instances insert clips are artfully recorded to fill a predetermined duration of time. If a master clip leaves a gap of 3 seconds to place a person's name, the insert clip is recorded to fill up the entire 3 seconds. Thus, the underlying music track seamlessly integrates the master clip together with the insert clip. An insert clip may itself be a master clip, if the insert clip is designed for mixing with other media clips. The system also provides a mechanism for associating insert clips with keywords, key phrases, sound preview, image preview and any other data format that allow the system to identify, classify, sort or other manipulate the insert clip for purposes of data management, this information is commonly known as metadata. The producer marks the clip with insertion points. The invention contemplates the use of various techniques for marking insertion point. The system may, for instance, embed a signal having an identifiable pattern to mark a particular location in a master clip of other type of media clip. The signal is checked for when the system is looking for a location to place an insert clip. Other approaches involve defining location information and storing the location information along with the media clips (e.g., in a database system) in the form of metadata associated with the clip. Alternatively, the system may utilize a plurality of master clips that each begin and/or end at the point where an insert clip is to be placed. When the master clips are merged together with one or more appropriate insert clips the result is a seamless media clip ready for playback. Using this technique a song or some other type of recorded information is split into a set of compressed or uncompressed sequential files (e.g., WAV, AVI, MP3, OGG, etc . . . ), certain files are identified as insert files, the voice track is removed from the insert files, and an insert clip is recorded over the insert file. This allows for the appearance of an original recording since the background music continues to play along while a vocally personalized or context associated phrase is inserted into the media clip. In other embodiments of the invention, there is no need to remove the voice track because the insert clips are recorded without such information. Thus, the producer can create the insert clip by simply adding the appropriate voice data to the clip. In either case the master clips and insert clips are then merged together to create a finalized media clip. The system may generate the media clip on the fly by integrating the appropriate master clips and insert clips together, or it may retrieve a previously created media clip from the database. The producer of a media clip may define mixing and insertion properties. The system may use such properties to define the way an insert clip is merged together with one or more master clips. For instance, properties may enable the system to know when to fade the master clip signal to allow for seamless integration of an insert clip and slowly return to normal after the insert clip completes. The markings indicating the split and merge locations may be embedded codes or metadata stored separate from the clip.

The applications generated with embodiments of the invention reflect the flow of natural language. This is accomplished when a creator of the application writes at least one "generic" filler for every slot in the application and/or provides an alphabetic set of "generic" fillers for slots with highly variable information (e.g. name) and accounts for phonemic blending that occurs across closely annunciated phrases. If the writer has determined that certain phonemic blends will produce a "dirty" post-produced result, and has decided to include the content preceding and following a slot, the studio guide should incorporate the preceding and following content in every read of the variable. A "dirty" blend occurs whenever a phoneme (vowel or consonant utterance) crosses into the following word in natural language. For example the application: "Hey [description], it's Hilary again." In this application, the slot is "description", but a natural-sounding flow is best achieved by reading the "Hey" into the token (insert clip). Assuming we had several generic fillers: "guy", "girl" and "friend" the studio guide for the celebrity voice artist shows the "Hey" with each read as "hey guy", "hey girl" and "hey friend" for example.

In the example above, most English-speaking people would never insert a meaningful pause between the "Hey" and the word that follows. Instead, the words are blended together to form a single utterance that sounds a bit like "Heyguy" or "Heygirl". Two rules for determining dirty blends are if at least one of two adjoining words in a script is a variable, and no natural-sounding pause would occur, then it is a dirty blend and if a preceding word in the script ends with the same consonant or vowel sound as the word that follows (e.g. first student, selling ingots) then it is a dirty blend. Finding this kind of blend in the script is a matter of reading it aloud at the same rate the writer intends to instruct the voice artist to read it, then adjusting the script and studio guide to accommodate recording before and after a variable, if needed.

Figure 5:
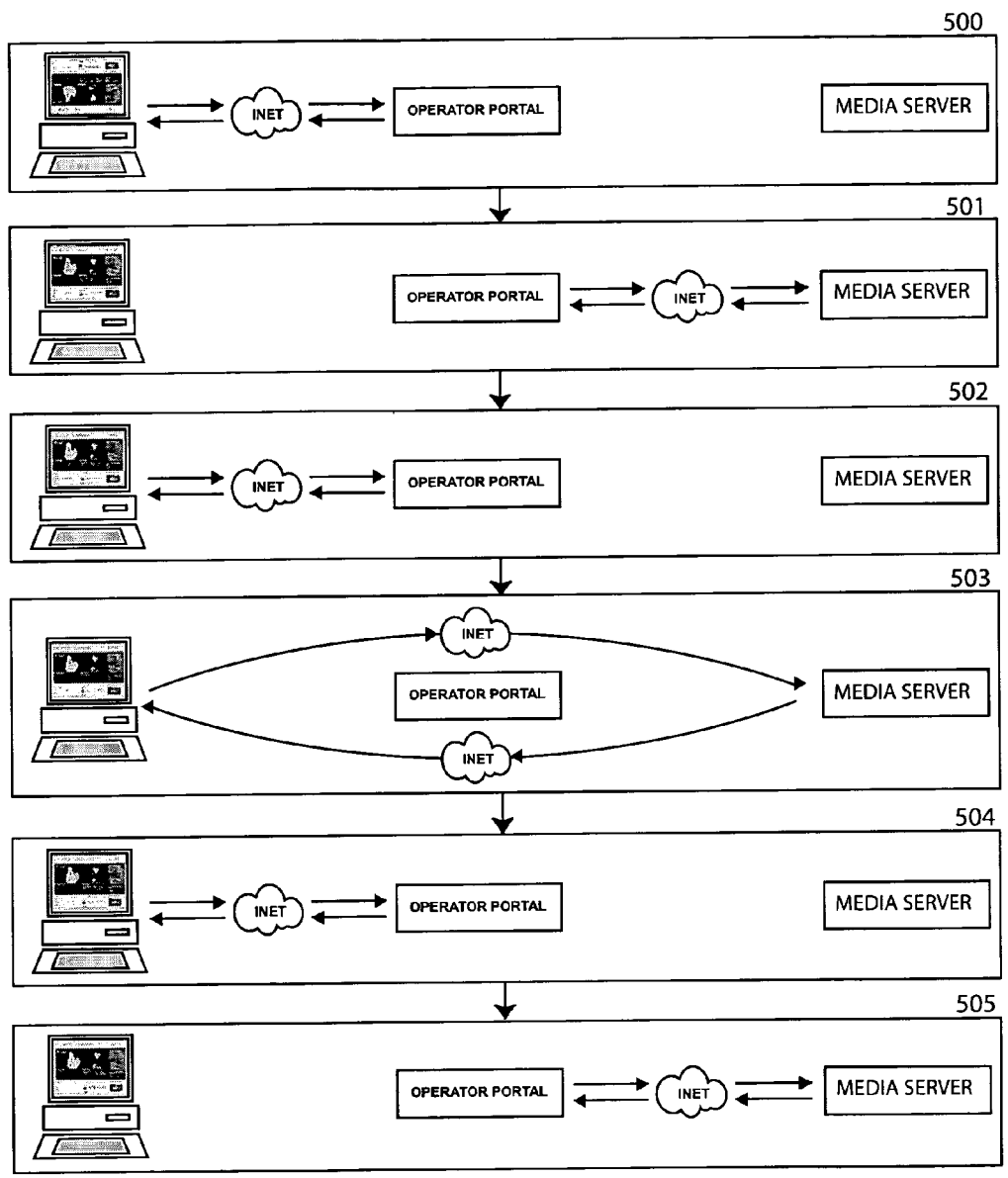
FIG. 5 illustrates a flow chart showing the interactions of the system components for a telephonic ring tone and/or ringback tone embodiments of the invention.

FIG. 5 illustrates a flow chart showing the interactions of the system components for a telephonic ring tone and/or ringback tone embodiments of the invention. A user selects personalized content at 500, this is shown in the block as a client computer on the left associated with a user visiting an operator portal such as a telephone company portal and selecting personalized content. The operator portal communicates with the media server at 501 to determine what personalized applications are available and to obtain the associated variable names and to supply or receive any other information required, such as for example the bit rates desired for delivery to the specific target telephonic client device such as a particular cell phone. The user configures the ring tone or ringback tone at 502, this can involve selecting a particular celebrity voice to use for the personalized clip and filling out forms to account for the required insert clips, for example recipient name, caller name or any other variables required for generation of the resulting clip. The user interacts with the operator portal in this step. The user previews the clip at 503 when the operator portal redirects the user to a preview window to allow the user to access the clip from the media server. The user confirms the transaction at 504 via the operator portal. When the transaction is complete at 504, the operator portal retrieves the finished clip or clips and uses the clip for a ring tone, ringback tone or answering message as appropriate.

An example of an XML embodiment of an application is a single document may be utilized to describe the structure of the audio file, clip or clips to be delivered. The application XML is described in the table below:

| Element | Function |
| --- | --- |
| <?xml version='1.0'?> | XML files begin with this element. Attributes: N/A. Notes: None. |
| <application> | Root element for audio application. The body of every application file begins and ends with this tag. Attributes: none. Notes: None. |
| <name> | A plain text name for the application. Example: <name>A Cinderella Story</name>. Attributes: None. Notes: None. |
| <id> | The application ID. An integer identifier for the audio application. This value is passed in by a requestor and processed by the audio server to determine which application to serve. Example: <id>1000</id>. Attributes: None. Notes: The integer value used in the ID is system-unique. HTTP request passes this data as app_id=[id] |
| <bitrate> | The default output bitrate for the application. Example: <bitrate>16</bitrate> Attributes: None. Notes: Bitrate is an integer value. |
| <samplerate> | The default output sample rate for the application. Example: <samplerate>22050</samplerate> Attributes: None. Notes: Sample rate is in hertz. |
| <channels> | The default output channel count. The audio server currently supports mono and stereo output. Example: <channels>1</channels> Attributes: None. Notes: This element has 2 valid CDATA contents: 1 (mono) and 2 (stereo) |

| Element | Function |
|---|---|
| <mime-type> | The default output encoding.<br>Example: <mime-type>audio/wav</mime-type><br>Example: <mime-type>audio/mpeg</mime-type><br>Attributes: None.<br>Notes: This element has 2 valid CDATA contents: audio/wav (PCM), and audio/mpeg (MP3). Other formats are readily added. |
| <segments> | The number of pieces of audio used to assemble the file.<br>Example: <segments count="5"><br>Attributes: count.<br>Notes: This element is a parent element of the <audio> tag described below, and its attribute "count" corresponds to the number of <audio> tags it contains. |
| <audio> | This element refers either to an audio file, or to a directory containing multiple audio files.<br>Attributes: type, id<br>Notes: The type attribute has two valid values, "static" which refers to static audio segments located at the application root, and "dynamic", which refers to directories at the application root containing multiple audio files. The id attribute is the file or directory name, and omits file extensions (i.e. ".wav") and trailing slashes. |

For clients performing HTTP GET or POST operations, several of the application parameters in the application file can be overridden at request-time by appending values to the HTTP query string or including them in the HTTP POST payload. The overrides are described below:

| Element | HTTP Override | Function |
|---|---|---|
| <mime-type>, <bitrate>, <samplerate>, and <channels> | enctype | Overrides all of the default elements for the application.<br>Format:<br>enctype = [format] – [bitrate] – [samplerate] – [channels]<br>Example:<br>enctype = pcm – 8 – 8 – 1<br>For example, this override may be used on an application whose deployed base audio is 16-bit, 22 KHz stereo, to deliver audio into a VoiceXML application that requires 8-bit, 8 Khz audio. |
| n/a | filename | This override causes the audio server to return additional, protocol-appropriate Content-Disposition headers, using the filename specified by the client. This is useful for tagging returned content requested VIA CURL and other popular HTTP packages. |

A sample application file for a ring tone incorporating a caller name, recipient name, and three static segments is shown in the table below:

```
/dir/111/application.xml
<?xml version='1.0'?>
<application>
    <name>Daffy Duck Ringtone Demo</name>
    <id>111</id>
    <bitrate>16</bitrate>
    <samplerate>22050</samplerate>
    <channels>1</channels>
    <mime-type>audio/mpeg</mime-type>
    <segments count="5">
        <audio type="dynamic" id="recipient_name"/>
        <audio type="static" id="static_01"/>
        <audio type="dynamic" id="caller_name"/>
        <audio type="static" id="static_02"/>
        <audio type="static" id="static_03"/>
    </segments>
</application>
```

The transcript for the sample application is:

"[recipient_name] This is Daffy Duck! [caller_name] is calling you. Don't tell me you're DUCKING your calls . . . Get it? Ducking your calls? Oh that's rich! Now come on my fine-feathered friend, ANSWER THE PHONE!"

To retrieve an mp3 preview personalized as follows . . .

"John! Oh, John! This is Daffy Duck! Bob is calling you. Don't tell me you're ducking your calls . . . Get it? DUCKING your calls? Oh that's rich! Now come on my fine-feathered friend, ANSWER THE PHONE!"

The integrator would issue the following HTTP request:

http://audio.MEDIASERVERNAME.com/
?app_id=111&recipient_name=john&caller_name=bob A media server or media generation engine may comprise many different types of hardware. An example of the type of hardware configuration may comprise Dell PowerEdge 2400 servers each with dual Pentium III Xeon processors with 512K L2 cache. Each server may be configured with 1 GB of main memory and 42 GB (6×7 GB) storage configured with software RAID 0+1. Alternatively the system may be deployed on higher density blade servers. Logically, systems that employ MPEG 3 encoding gain substantial performance benefits from faster processor speeds. Embodiments using seamless splicing of compressed formats may server higher numbers of users since the processing requirements of such implementations is significantly lower. This is due to the fact that encoding the output data does not have to occur on the entire output media clip as when raw insert clips are added to a raw master clip. Some compressed formats allow frames to be inserted in the middle of other frames without altering portions of the preceding or succeeding frames. These compression formats can be used in order to pre-encode master clips and pre-encode insert clips before splicing them together. This optimization can yield a two order of magnitude increase in numbers of users serviced per second versus a non-cached raw master and raw insert clip splice methodology and subsequent compression and network transmission.

Embodiments of the invention utilizing scalable architectures may transcode and/or compress the media clips resulting in a great reduction in network load offered by such compression. The system may perform WAV to MPEG 3 transcoding using LAME or any other encoder capable of compressing data into formats required for output by embodiments of the invention. While this scheme dramatically increases audio quality and/or reduces network demand by a dramatic ratio (10:1), transcoding and compression place heavy load on the media generation engine or media server in the case of context clip blending.

Another embodiment of the invention utilizes an encoder with settings designed to allow for seamless splicing of compressed media. This eliminates the need for a layer of compression engines dedicated to compressing the media clips and creates a system that is approximately 300 times faster than a brute force WAVE to MPEG-3 media clip cache-less personalization system.

Seamlessly splicing media clips may be performed for certain media types. Raw data types such as WAV, AIFF and AU format files are ordered in time without borrowing bits from preceding or succeeding frames and therefore may be sliced out and added in with impunity. Highly compressed formats may or may not allow for this type of manipulation of individual frames of data since highly compressed formats generally place data in easy-to-compress frames representing simple waveforms that should belong in a hard-to-compress frame. This interlacing of data makes the frames dependent upon one another.

MPEG-3 allows for compression with slight degradation of high end frequency spectrum by encoding frames to hold information only for the current frame. By setting the encoder to abandon the use of the bit reservoir and thereby degrading the frequency response slightly this is achieved. In addition, it is possible but more complex to use variable bit rate encoding with overlapping encodes and achieve frame independence but the recordings must overlap in time. Since the gain in frequency response is minimal and the calculations and bit manipulations are more complex embodiments of the invention using constant bit rate encoding without the bit reservoir may be used in situations where maximum sound quality is not required, and situations where maximum sound quality is required may use variable bit rate encoding with the higher complexity bit manipulation algorithms involved.

Depending on the encoder used for a given format, different artifacts may be created when encoding. For example, the LAME encoder software produces various blank spots on the front and end of encoded clips due to algorithms used in order to decode the clips. Certain encoders use MDCT/filterbank routines functionally similar to decoder routines and leave 528 sample delays at the front of encoded files.

For embodiments of the invention employing LAME, seamless splice media clips may be created by clipping the first granule (576 bits) of the encoding insert clip encoding using LAME software which contains MDCT coefficients and eliminating the ID3 metadata from the file and the last 288 bits at the end of the insert clip. The resulting media clip contains no front or back-end artifacts, metadata or data dependencies to hinder the independent insertion into a master clip.

In one scenario, a user utilizes the system embodying the invention to send customized messages (e.g., an invitation, advertisement, reminder, etc.) to one or more other users (e.g., recipients). In this example, a user may connect to a server and input a list of other users who are to receive the customized message. The sending user may select a master clip for distribution and the system assembles a multimedia clip for distribution using the list of user information to identify an appropriate insert clip(s) to merge with the master clip. The system is also capable of retrieving context information to determine the best communication path to reach the recipient and/or the recipient's availability. The system may obtain other context information such as availability information, personal information (e.g. address and phone number), and any other context information useful for purposes of assembling and disseminating the multimedia clip. The system utilizes the context information in several ways. For example, the system may send messages at different times depending on the distance between the residence location of each recipient and the location of the meeting. The system may also send the message using different transport mechanisms depending upon the whereabouts of the recipient. If the user is currently using the Internet, the system may elect to email the message. Otherwise the system may opt to transmit an audio message to a voicemail system or to contact the user by making a cellular phone call.

In another scenario, the system retrieves recipient information (e.g. first and last names, his/her title etc.), and assembles a multimedia clip appropriate for each user. The system may for instance, alter the language, gender, tone, or any other modifiable aspects of the voice track depending upon the characteristics of the user. The system may also select an appropriate mechanism and format for the multimedia clip and thereby produces a multimedia clip specific to each user.

In one or more embodiments of the invention the personalization variables or insert variables are mapped to existing insert clips. For example, for an application that comprises a name variable and the application enables a user to type in a name for a person in which to personalize a message, non-existent names are mapped to the closest possible name. In this manner, a personalized message for a user name "Joseph" may map to "Joe". In addition, decency standards may be applied for example when a user types in (or says) a word that is inappropriate for the insert clip, for example a curse word may be mapped to an acceptable word that is not offensive. Using 1300 names in the United States covers 80% of the population, so mapping all of the rest of the names to a generic name such as "sir" or "madame" for names that are not found yields 80% coverage for a small processing price.

As the generation of media clips may occur asynchronously with regards to their actual transmission, embodiments of the invention may be utilized by cell phone companies to obtain ring tones and ring back tones along with other personalized media, such as button vocalizations in a celebrity voice for example. As the generation of personalized media occurs when a user purchases a personalized ringback tone for example, the generation of the media clip for a given incoming phone number for a given caller id may occur at any time before the clip is actually used. The revenue generated from the sale of the personalized media clip comes from the telephone company which may charge their clients a different fee, or a fee for each use of the generated media clip.

Thus, a method and apparatus for generating and distributing a set of personalized media clips has been described. The claims however and the full scope of any equivalents are what defines the invention.

What is claimed is:

1. A system for generating and distributing personalized audio comprising:
    an insert clip of audio;
    a master clip of audio having an insertion point;
    a network interface;
    a computer coupled with said network interface wherein said computer further comprises a memory device comprising said insert clip and said master clip;
    a playback device coupled with said network interface wherein said playback device is identified to said computer with an identifier selected from the group consisting of RFID, credit card number, ANI and DNIS; and,
    a process executing on said computer wherein said process is configured to encode said insert clip into insert clip packets and encode said master clip into master clip packets wherein all of said insert clip packets and all of said master clip packets are encoded into a degraded frequency response compressed format each packet of which holds information only for a time duration of each respective packet and wherein said process is further configured to combine said insert clip with said master clip at said insertion point to create a personalized audio clip using seamless splicing at said insertion point wherein said personalized audio clip is created for said playback device based on said identifier.

2. The system of claim 1 wherein said playback device is configured to ring with said personalized audio clip.

3. The system of claim 2 wherein said personalized ring audio clip comprises a celebrity voice.

4. The system of claim 1 wherein said playback device is configured to ringback with said personalized audio clip.

5. The system of claim 4 wherein said personalized ring audio clip comprises a celebrity voice.

6. The system of claim 1 wherein said insert clip packets and said master clip packets are selected from the group consisting of MP3, OGG, Flash and video data.

7. The system of claim 1 further comprising a context clip comprising context information wherein said master clip further comprises a second insertion point and wherein said computer is further configured to combine said context clip with said master clip at said second insertion point with undetectable transitions at said second insertion point.

8. The system of claim 7 wherein said context information is selected from a group comprising time, date, location and temperature information.

9. The system of claim 7 wherein said insert clip, said master clip and said context clip comprise a celebrity voice.

10. The system of claim 1 wherein said playback device is selected from a group consisting of a browser, PDA, cell phone, GPS receiver, slot machine, loyalty card reader, credit card reader, ATM machine, kiosk, toy, digital cable set-top box, hotel door and personal computer.

11. A method for generating and distributing personalized audio comprising:
    obtaining an insert clip of audio;
    obtaining a master clip of audio having an insertion point;
    coupling a computer coupled with a network interface wherein said computer further comprises a memory device comprising said insert clip and said master clip;
    coupling a playback device with said network interface;
    identifying said playback device to said computer with an identifier selected from the group consisting of RFID, credit card number, ANI and DNIS;
    encoding said insert clip into insert clip packets and encoding said master clip into master clip packets wherein all of said insert clip packets and all of said master clip packets are encoded into a degraded frequency response compressed format each packet of which holds information only for a time duration of each respective packet;
    combining said insert clip with said master clip at said insertion point to create a personalized audio clip with seamless splicing at said insertion point wherein said personalized audio clip is created for said playback device based on said identifier.

12. The method of claim 11 further comprising ringing said playback device with said personalized audio clip.

13. The method of claim 12 wherein said personalized ring audio clip comprises a celebrity voice.

14. The method of claim 11 further comprising providing a ringback to said playback device comprising said personalized audio clip.

15. The method of claim 14 wherein said personalized ring audio clip comprises a celebrity voice.

16. The method of claim 11 further comprising:
    obtaining a context clip and obtaining a context insert point;
    blending said context clip seamlessly with said audio clip at said context insert point.

17. The method of claim 11 further comprising:
    formatting said audio clip for said playback device and transmitting said audio clip to said playback device.

18. A system for generating and distributing personalized audio comprising:
    means for obtaining an insert clip of audio;
    means for obtaining a master clip of audio having an insertion point;
    means for coupling a computer coupled with a network interface wherein said computer further comprises a memory device comprising said insert clip and said master clip;

means for coupling a playback device with said network interface;

means for identifying said playback device to said computer with an identifier selected from the group consisting of RFID, credit card number, ANI and DNIS; and, means for encoding said insert clip into insert clip packets and encoding said master clip into master clip packets wherein all of said insert clip packets and all of said master clip packets are encoded into a degraded frequency response compressed format each packet of which holds information only for a time duration of each respective packet;

means for combining said insert clip with said master clip at said insertion point to create a personalized audio clip with seamless splicing at said insertion point wherein said personalized audio clip is created for said playback device based on said identifier.

* * * * *